United States Patent [19]

Liu et al.

[11] Patent Number: 4,777,856

[45] Date of Patent: Oct. 18, 1988

[54] DANCING-MUSICAL INSTRUMENT

[76] Inventors: Zhongdu Liu; Zhongxian Liu, both of Room 110, No. 5, XinJieKouWai-DaJie Beijing, China

[21] Appl. No.: 895,350

[22] Filed: Aug. 11, 1986

[30] Foreign Application Priority Data

Aug. 14, 1985 [CN] China ................................ 85106070
Jul. 26, 1986 [CN] China ................................ 86105546

[51] Int. Cl.[4] ...................... A63J 17/00; G09B 15/04; G10H 1/00; G10H 5/00

[52] U.S. Cl. .................................. 84/1.01; 84/464 A; 84/478; 84/423 R; 84/DIG. 7; 84/DIG. 25

[58] Field of Search ................. 200/86 R, 86 S, 86 A; 84/1.01, 1464 R, 464 A, 477 R, 478, 423 R, 433, DIG. 7, DIG. 8, DIG. 25

[56] References Cited

U.S. PATENT DOCUMENTS

| | | | |
|---|---|---|---|
| 3,704,399 | 11/1972 | Niinomi | 84/1.24 |
| 3,754,495 | 8/1973 | Honegger | 84/1.01 X |
| 3,956,958 | 5/1976 | Nash et al. | 84/DIG. 7 |
| 3,997,863 | 12/1976 | Luce | 84/DIG. 7 |
| 4,121,488 | 10/1978 | Akiyama | 84/DIG. 7 |

FOREIGN PATENT DOCUMENTS

| | | | |
|---|---|---|---|
| 2526624 | 1/1976 | Fed. Rep. of Germany . | |
| 57-8595 | 1/1982 | Japan . | |
| 60-98492 | 6/1985 | Japan . | |

*Primary Examiner*—Stanley J. Witkowski
*Attorney, Agent, or Firm*—Collard, Roe & Galgano

[57] ABSTRACT

A new type of musical instrument and performance apparatus is disclosed and is used with the special performing art called "Instrument dance", "instrument exercise" or "instrument boxing" etc. The instrument comprises a floor keyboard, on which the performer can either dance and produce switching signals with his or her feet, hand or hand hammer in accordance with the intention of the performer. In addition, a similar wall keyboard is provided along with a multi-color system and an electronic organ circuit. The performer can play on the floor keyboard while at the same time adjusting with ease the tone, timbre, volume and color, to thereby achieve the multiple artistic effect of a single performer producing the shape, sound, light and color of the performance.

13 Claims, 6 Drawing Sheets

DANCING-MUSICAL INSTRUMENT

BACKGROUND OF THE INVENTION

The present invention relates to a new type of musical instrument for use in the special performing art known as "instrument dance", "instrument exercise", "instrument acrobatics", "instrument boxing" and which may be used in performing, contests and health care.

Traditional dancing, which in the broad sense comprises free exercise, acrobatic, gymnastics, acrobatics, martial arts consists in showing the beauty of the performer's body movements and gives the viewer a visual enjoyment according to the "dancing choreography" written by a choreographer. In addition, traditional instrument playing consists in the playing of a musical instrument by the musician according to the musical score written by a composer to produce the audio-artistic effect in the audience. Dancing ususally requires special musical accompaniment. Thus far, these two performing art forms cannot be integrated into each other so as to be performed by the same performer and hence the talent of an artist cannot be fully shown.

SUMMARY OF THE INVENTION

The purpose of this invention is to provide an apparatus for recreation and entertainment performance, which serves both as a keyboard instrument for producing music by the performer, and as the stage on which the performer shows his or her dancing. The performer integrates instrument music with dancing art either by playing according to the "dancing and musical score" or by improvising. This is the creation of a special kind of performance art.

Another purpose of this inventon is to provide an apparatus which can, through a kind of "light and color system", realize a variety of artistic light and color effects as directed by the performer. The light and color changes synchronously with the musical notes, to accomplish the multiple art of shape, sound, light and color, bringing the performer's artistic talent into full play.

The dancing and musical instrument of this invention comprises a floor key board on which the performer can both dance and produce switching signals corresponding to the performing content by the touch of the performer's foot, hand, other part of the body or with a hand hammer. A similar wall keyboard can be provided along with a multifunctional electronic organ circuit. Certain switching signals are produced when the performer dances on the floor keyboard or touches the keys of the floor or wall keyboard with the foot, hands, other parts of the body or with hand hammers. These signals are sent to key circuits of the electronic circuit as key signals. The output signals of the electronic organ circuit will be sent to the amplifier and loudspeaker and the corresponding music is produced. The instrument of this invention may also comprise a sound/light signal separation circuit, a light signal processing circuit and a light-driven circuit. The sound/light signal separation circuit separates the switching signal into a musical tone audio signal and a light signal. After being reshaped by the light signal processing circuit, the light signal is sent to the light-driven circuit to drive the three light sources of red, green and blue colors. Using the three basic colors, a variety of dynamic effects of colored light in relation to the dancing performance and the musical notes is created.

BRIEF DESCRIPTION OF THE DRAWINGS

The following is a brief explanation of the accompanying figures.

DESCRIPTION OF THE PREFERED EMBODIMENT

The following is a description of the embodiments of the present invention in association with the accompanying figures. In the figures, the same numerical designation represents the same parts.

Figure 1:
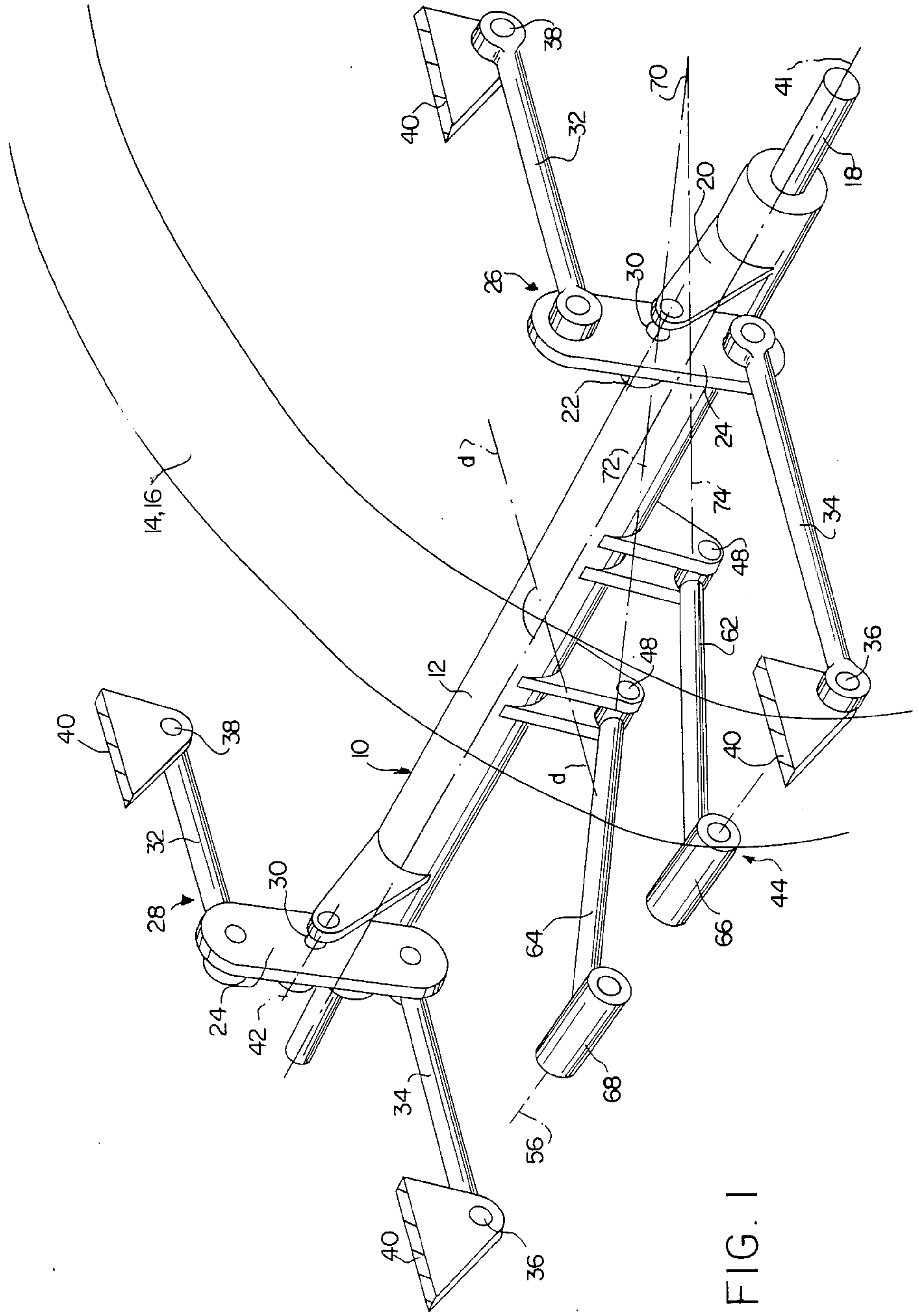
FIG. 1. is a block diagram of the electrical system of the present invention.

FIG. 1 is a block diagram of the instrument circuit system of the present invention wherein the contact type floor key board comprises many key means. When the dancer in the dancing shoe 23 steps on the floor key board, the key means is turned on to produce a switching signal which passes through the sound/light signal separation circuit 24. The sound/light signal separation circuit 24 separates the light signal and the sound signal from the switching signal of the floor key board. The sound signal reaches the key circuit in the electronic organ circuit system 25, to produce a sound corresponding to the key which has been turned on. The contact type wall keyboard 2 comprises many keys, which are connected to the key circuits of the electronic organ circuit system. When those key means are struck by the performer with the hammer, switching signals are produced which in turn are sent to the key circuits of the electronic organ circuit system 25, to control the automatic chord of the bass. The stereo musical signals from the left track L and right track R of the electronic organ circuit system 25 are amplified by the hi-fi stereo amplifier 26 and then emitted in the form of sound at the left and right frequency division loudspeakers of the hi-fi stereo system (12, 12'). The light signal is sent to the light signal processing circuit 27, which, reshapes the color pulse signal, extends its back edge and makes the front edge timed with the back edge, and then sends it to the thyristor three-phase stage searchlight driver main circuit 28, which drives the red, green and blue stage searchlight groups 29, 30 and 31. At the same time, by means of the color source separating transformer 32 (built in) connected with circuit 28, the three groups of red, green and blue color effect lamps 33, 34 and 35 in the electronic organ are controlled and adjusted. In the figure, A~, B~, C~ are input terminals of the three phase power source respectively, and 0 is the zero terminal. Elements 36 and 37 are the voltage stabilizer system. Element 21 is the volume control lever, regulating the amplification factor of the hi-fi amplifier 26 and hence the volume of the music through a rod sliding left and right. Rod 13 is for timbre selection. There are 12 choices, such as piano, electronic organ, clarinet, violin, etc. Element 14 is for tempo control of the automatic accompaniment. Control 15 is for the selection of the automatic meter, where one has 18 different dancing meters to choose from, such as waltz, tango, samba, disco, etc. Element 19 is the controller of glissandi and vibrato.

In addition, the signals from the floor keyboard 1 in FIG. 1 can be directly sent to the circuit of the electronic organ without passing through the sound/light signal separation circuit. Then there would be no effect of change of the colorful lights.

Figure 2:
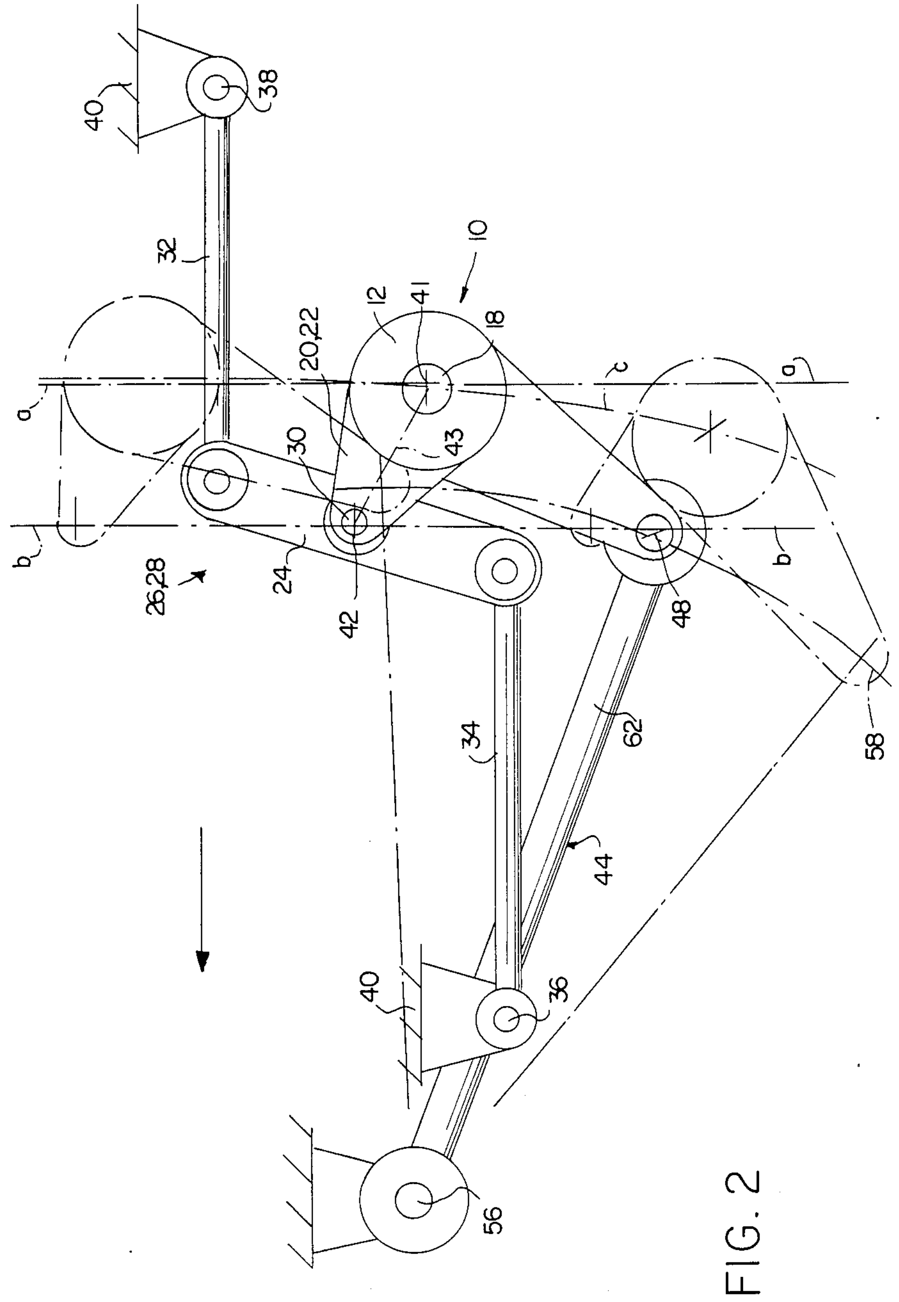
FIG. 2. is a sketch of the exterior of one of the embodiments of the present invention.

FIG. 2 is a sketch of the appearance of one model of the dancing-musical instrument designed on the principle shown in the block diagram of FIG. 1. A contact type rigid floor keyboard 1 and a contact type rigid wall keyboard 2 are supported by a support 3 which is made of light metal and is readily dismounted 3. A first group of keys 4, 5 and are provided on the floor keyboard on which one can play melodies by stepping on them. A the second group of keys 6, 7 of the floor keyboard are also provided with which one can also play melodies by stepping on them. Keys 8 and 9 are contained on the wall keyboard with which one can play broken chords or bass contained on accompaniment by hitting them. Key 10 is used for imitating percussion instruments. Panel 11 is for provided functional control of the electronic organ and 12 & 12' are resonance boxes for stereo hi-fi three-way stereo loudspeakers. Lever 13 is used for the timbre selection and a the tempo controller 14 is used for automatic chord broken and bass accompaniment. An automatic rhythm selector 15 is provided. The translator interface boxes for elements 13, 14 & 15, are 16, 17 and 18 respectively. The controller 19 is for glissandi and vibrato and the potentiometer 20, volume control lever 21, the main power switch 22 and the conductive dancing shoe 22 are also shown.

Figure 3:
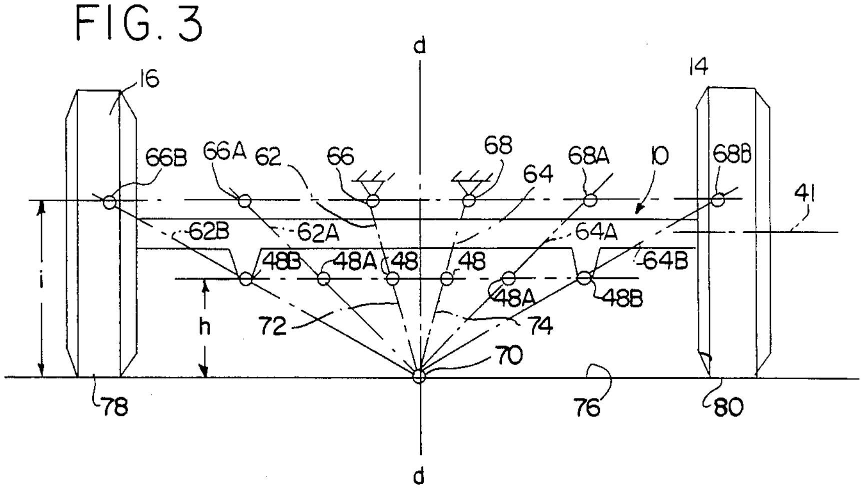
FIG. 3. is a sketch of the color areas of one of the keys of the keyboard.

FIG. 3 is a sketch of the color area of one key on the contact type rigid keyboard. W is the white area, i.e., where the red, green and blue lights are lit up at the same time with brightnesses in a specific proportion as dictated by the principle of three base colors. R is the red area, G is the green area, and B is the blue area.

When a player in the dancing shoe steps on a certain key, relevant lights will be produced. For example white light (with all the three sets of red, green and blue lights lit up) will be emitted, when the foot steps on the white area 38. Red and green lights will both be on when the foot is at 39 stepping on both the red and the green areas. Only blue light will be produced when only the area B is stepped on as with the ball or toe of the foot. In a word, with one key of the floor keyboard, only one tone can be produced, but any of the seven colors Red ("R"), Blue ("B"), Green ("G"), White ("W"), R+G, G+B, and R+B can be obtained when the player dances.

Figure 4:
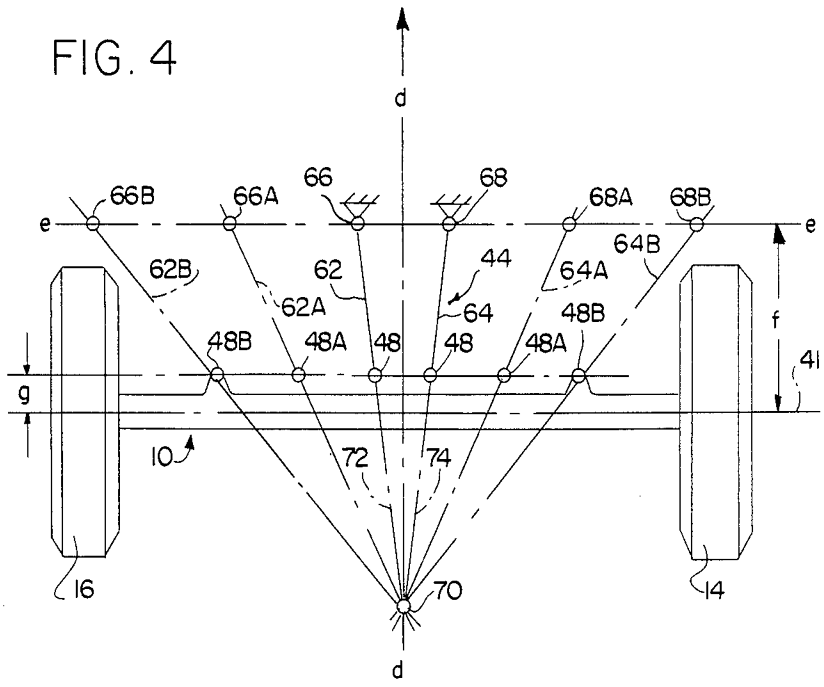
FIG. 4. is another example of one of the keys.

FIG. 4 shows another embodiment of the invention, where the keys are arranged in an annular area, with 41, 42 & 43 corresponding to 38, 39 & 40 of FIG. 2, respectively.

Figure 5:
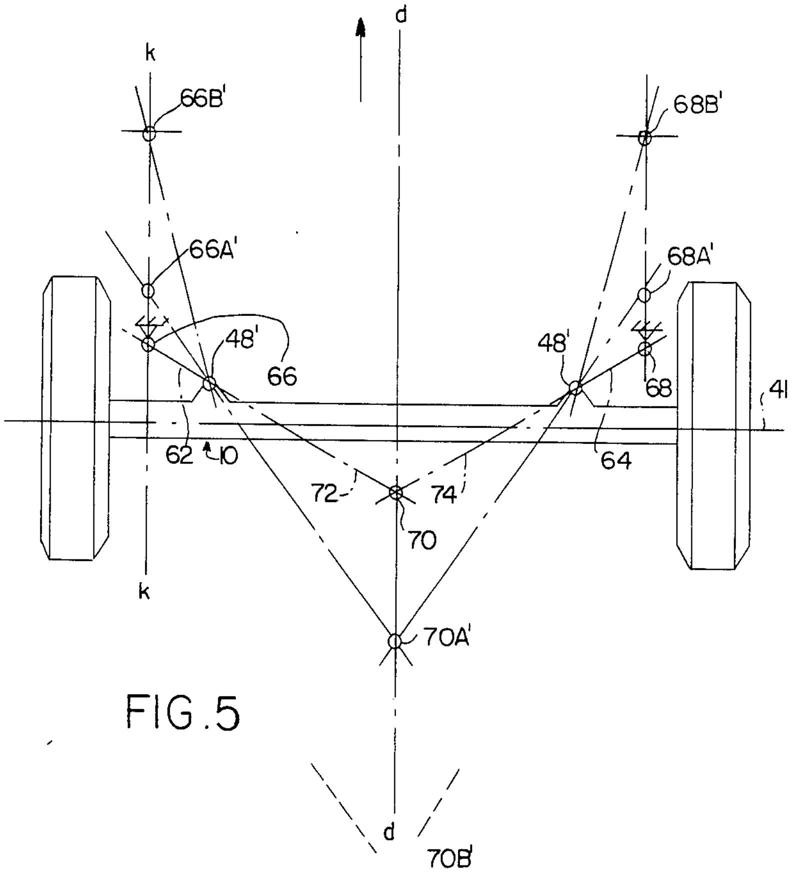
FIG. 5. is a diagram showing the electrical principle of a rigid immobile key.

FIG. 5 shows schematically the principle of the contact type rigid immobile key, where the conductive rubber sole of the dancing shoe 44 is shown to be stepping on two electrodes and connecting them. In the figure, the common terminal COM is connected to electrode W, sending the high level of the terminal COM to line W signal reflecting the duration of the step. The signal will produce a corresponding tone through the electronic circuitry, and corresponding color of the stage searchlight (white in this case) through the sound/light signal separation circuit. In this kind of key, there are all together 6 terminals, but it could be only 2 terminals when the light effect is not required.

Figure 6:
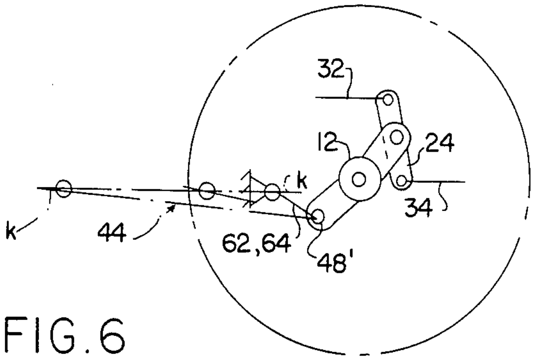
FIG. 6. is drawing showing part of the electrode of FIG. 5.

FIG. 6 is a magnification of the part 45 of the key in FIG. 5 to show the shape and arrangement of the electrodes, where the rigid conducting electrodes are made by etching away a circuitous part of the copper coating on the base plate.

Figure 7:
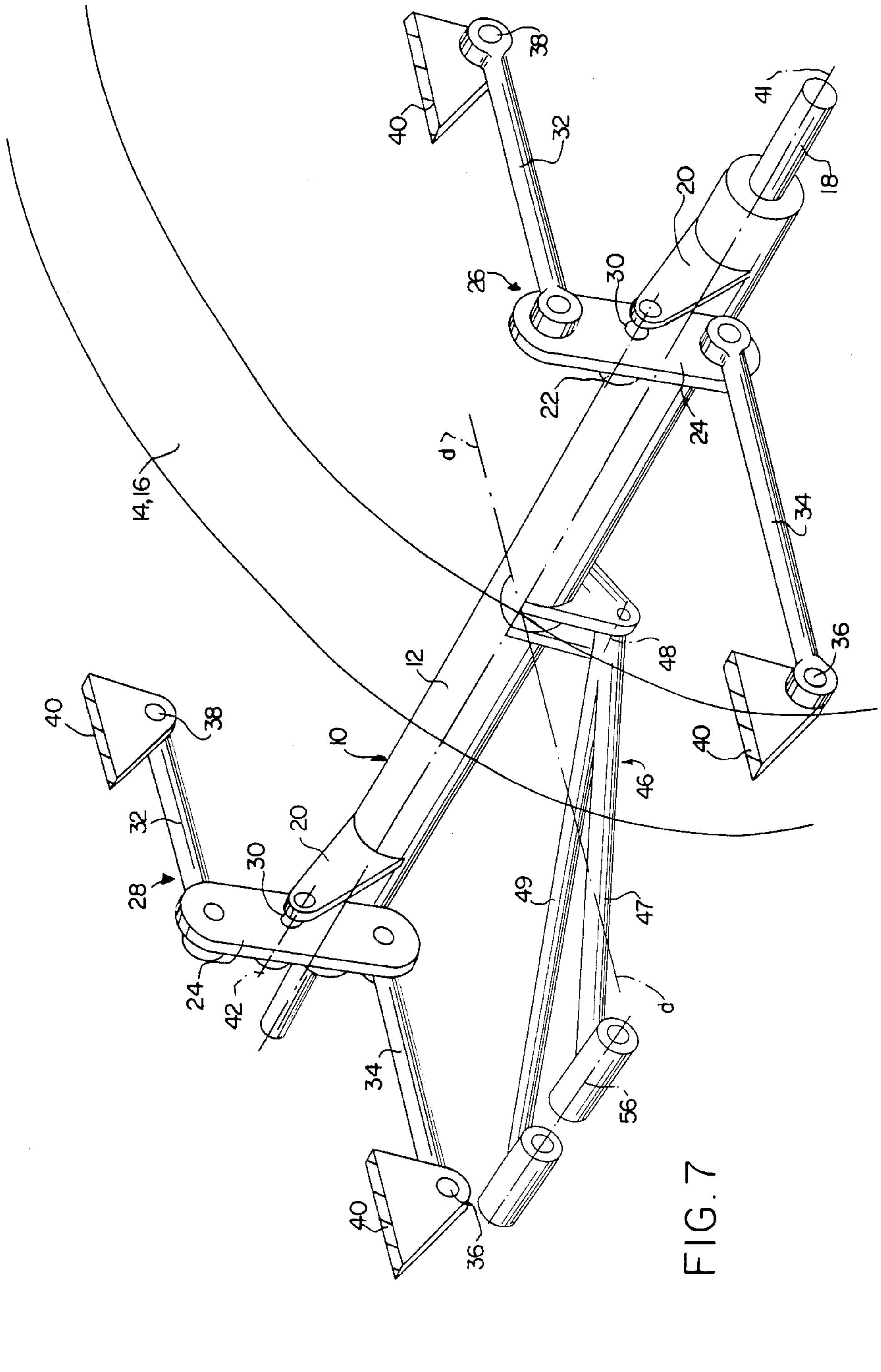
FIG. 7. is sketch of the controller of glissando vibrato.

FIG. 7 diagramatically shows the principle of the glissando and vibrato controller, where 52 is a clock-frequency micro-adjustment potentiometer of the tone clock oscillator in the electronic organ circuit and where element 49 is the transmission arm of the potentiometer. Rubber band 50 is stretched by a spring 53 and screw 51 is a fastening screw to fix and adjust the rubber band 50 and 54 is the means to fix the other end of the band 50.

When a performer plucks with his hand or with a hammer or pushes or pulls the stretched rubber band, the slide of a potentiometer 20, as shown in FIG. 2, will move accordingly, making micro-adjustments to the frequency of the tone producing clock oscillator of the electronic organ thereby making a smooth transition between different tones or producing an effect of a vibrato with varying frequency.

Figure 8:
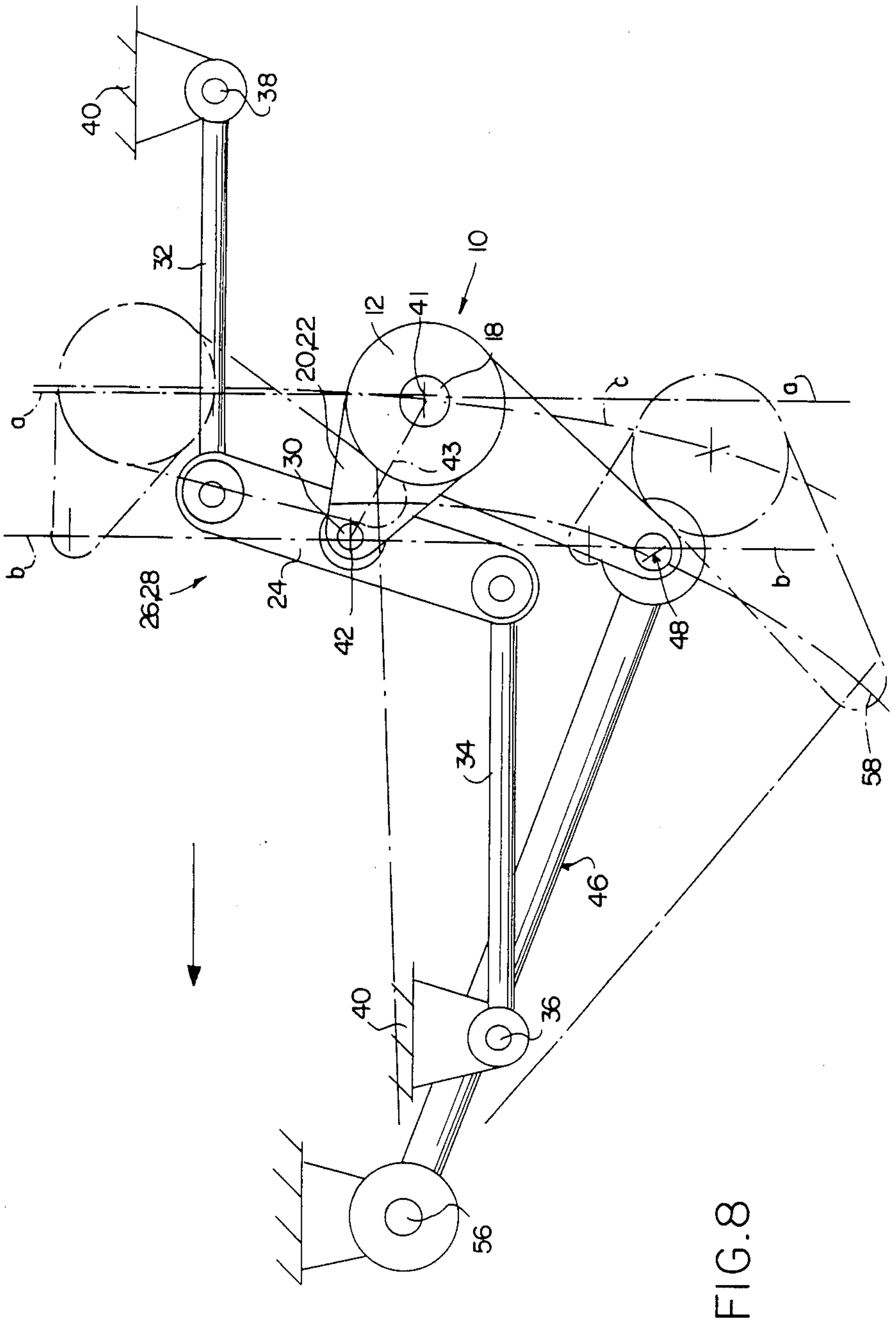
FIG. 8. is cross-section of the hand hammer for special use with the present invention.
Figure 2:
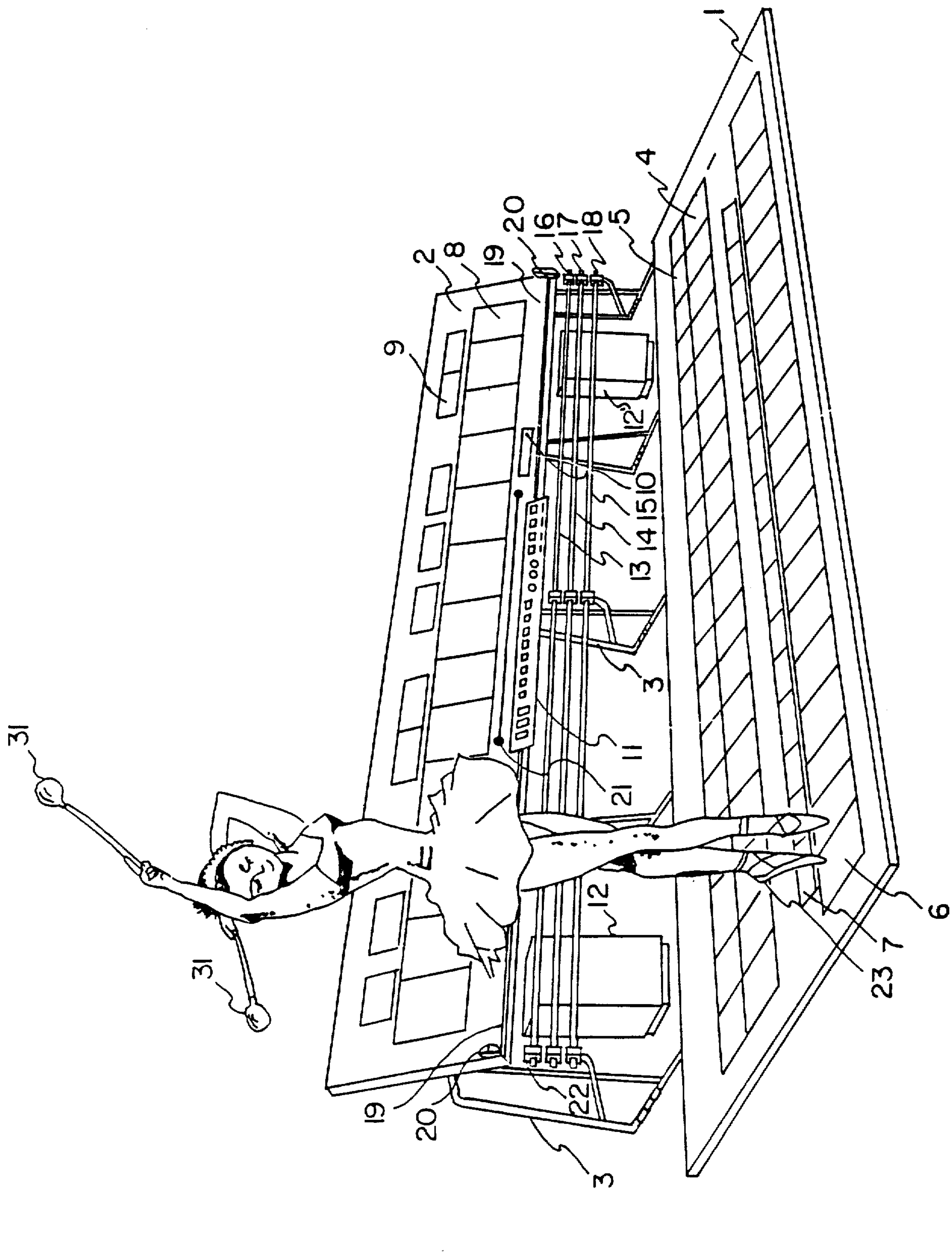
Figure 3:
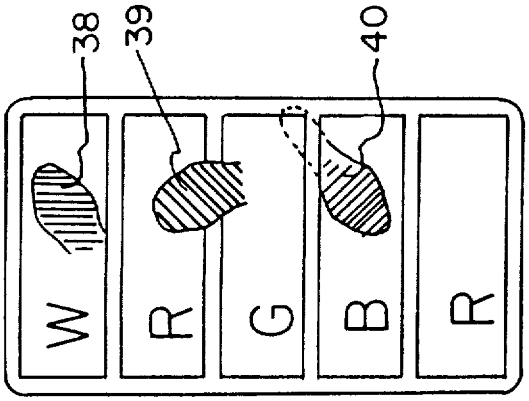
Figure 4:
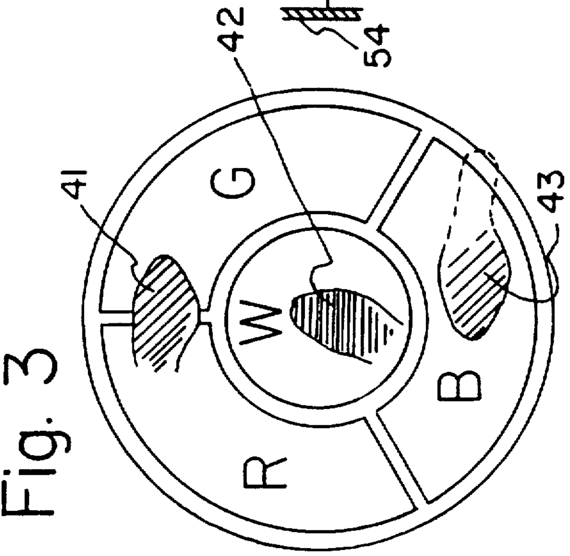
Figure 5:
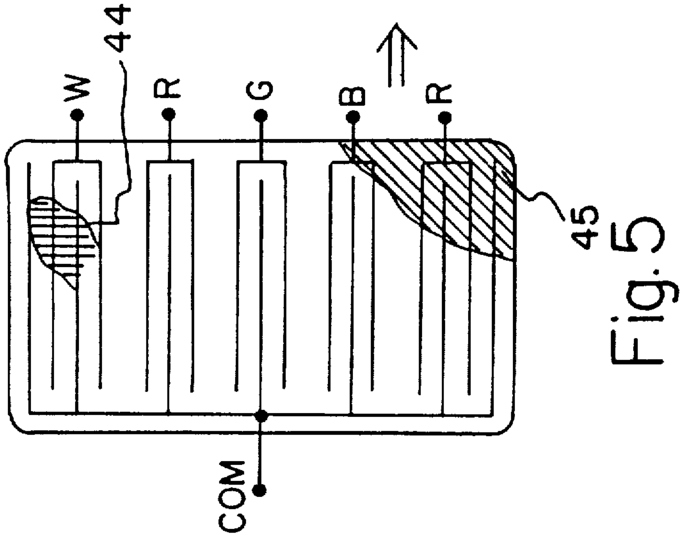
Figure 6:
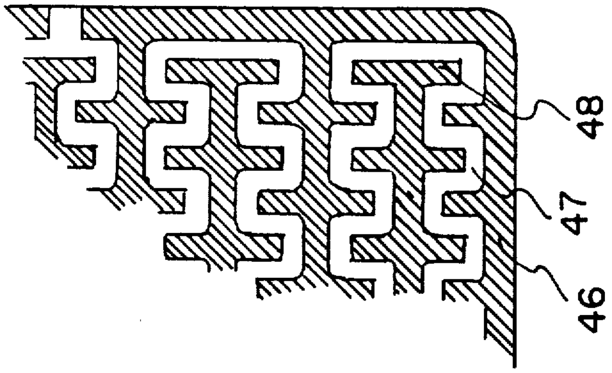
Figure 7:
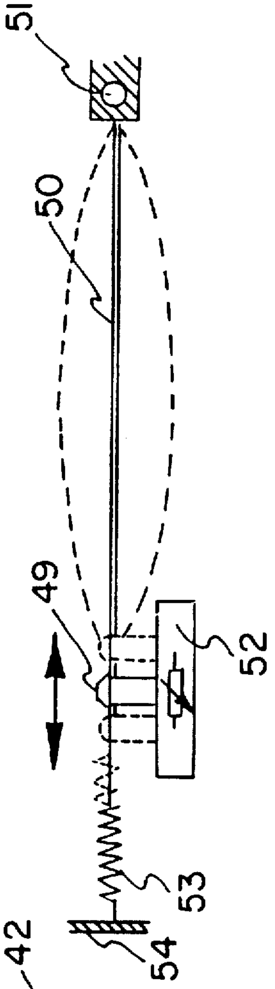
Figure 8:
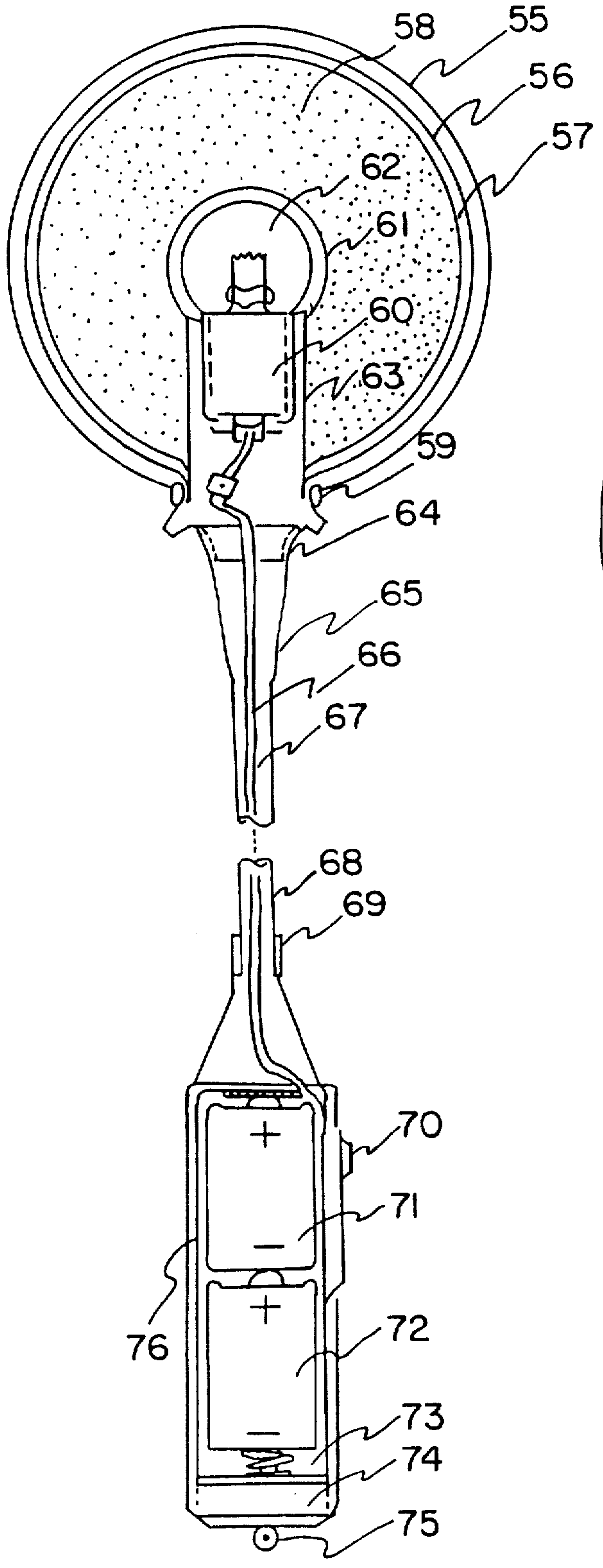

FIG. 8 is a sketch showing the longitudinal cross-section of the hammer made especially for this instrument, where 55 is the hammer head, 68 is the chrome-plated hammer shank, and 76 is the handle. Inside the hammer head is an incandescent lamp 62 connected with the wire 67. Element 61 is a transparent plastic protective cover and 63 is the base for the socket 60 of the lamp. The hammer head 55 is attached to base 63 and may be removed to change the bulb or attach a new hammer head. Element 58 is a transparent elastic foam plastic. Film 57 is a transparent colored plastic film and 56 is an electrode made of a soft network of fine wire or of other soft transparent electrically conductive film. Element 59 is a metal hoop fastening the hammer head 55 to the base 63. Element 64 is a connecting part with threads, 65 is a chrome-plated tapering part of the shank, and ring 69 is the strengthening ring. Switch 70 is the switch for the bulb, elements 71 are the battery cells and 73 is the cell compartment with compressive spring. Door 74 is the back cover to be opened when changing the cells an 75 is a metal ring to hang the hammer when putting it away, or to hang other musical devices, such as bells, on it during dancing.

Figure 9:
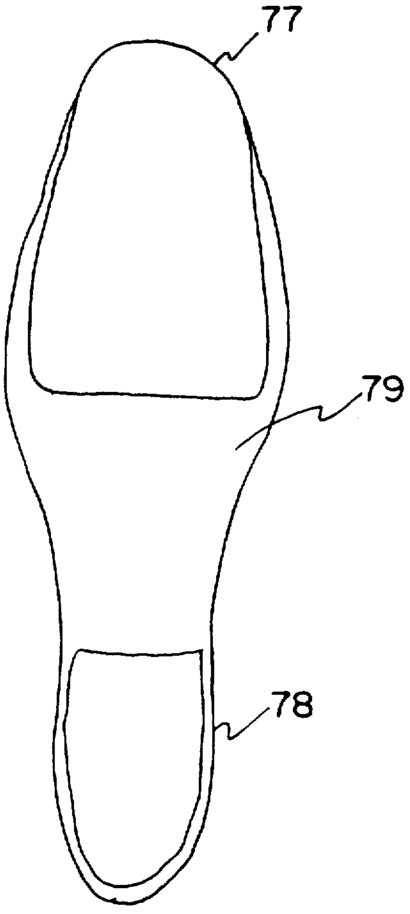
FIG. 9. is a sketch of the plan of the dancing shoe for special use with the instrument of the present invention.

FIG. 9 is a sketch showing the bottom view of the dancing shoe, where the dark areas 77 & 78 are electrically conductive rubber electrodes stuck to the sole of the shoe.

Figure 10:
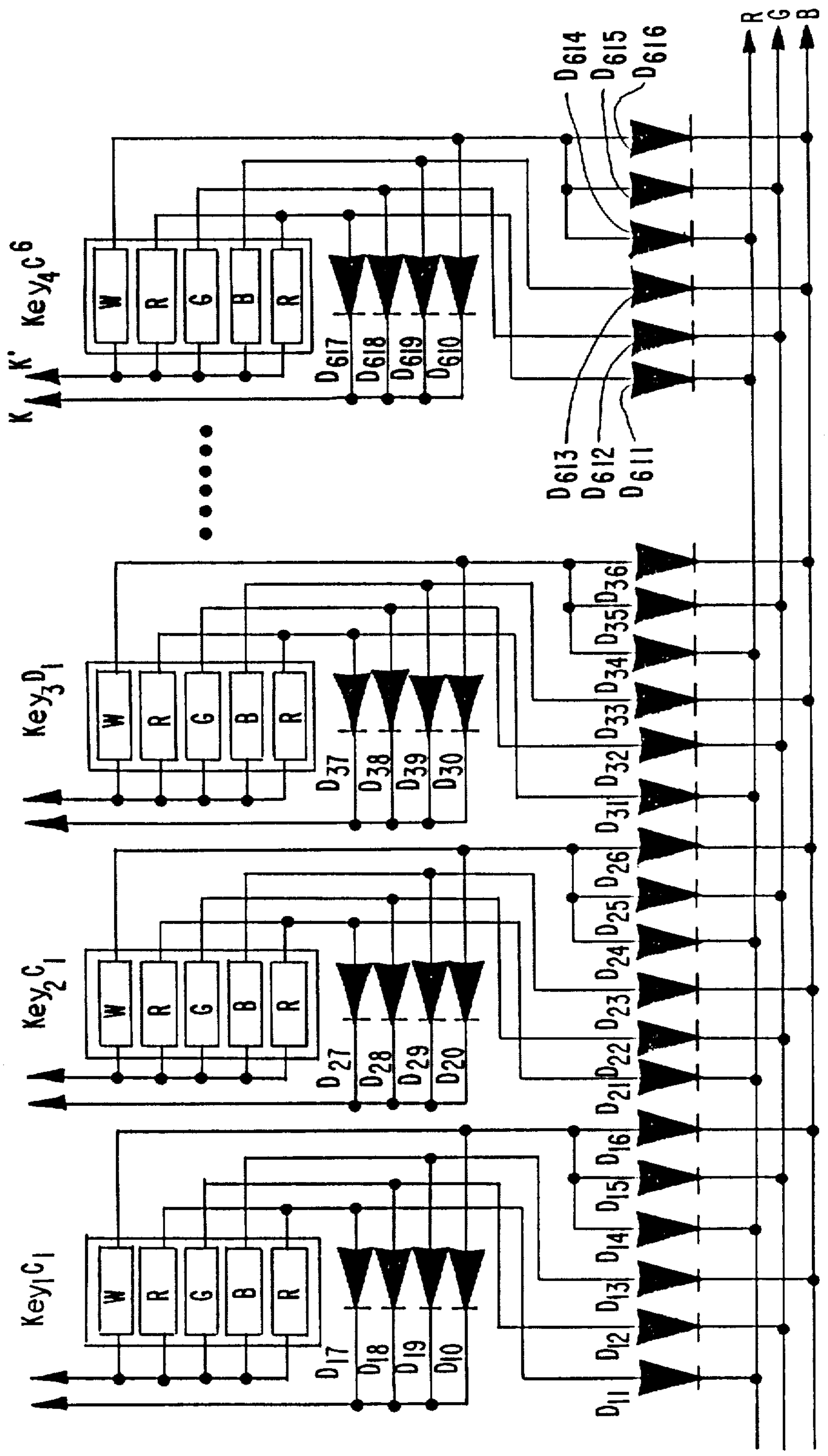
FIG. 10. is diagram showing the electrical principle of the sound/light signal separation circuit for the 61 keys of the floor keyboard.

FIG. 10 is diagram of the sound/light signal separation circuit for the 61 keys of the floor keyboard of the instrument, where $Key_1$, $Key_2$, $Key_3$, . . . $Key_{61}$ are the keys of the tones $C_1$, $C_1$, $D_1$, . . . $c^6$, on each of which the areas W, R, G, R are color sensitive regions. In the figure, the working of the different keys are based on the same principle. For example, when a performer steps on $Key_{61}$, the high level at the terminal K' (connected to the interface of the electronic organ key circuit) will extend to the color sensitive area, with the sound signal passing through one or several of the diodes D617, D618, D619, D610, and feeding back to the electronic organ circuit from terminal K. This signal produces the tone corresponding to the $Key_{61}$, and with the light signal passing through one or several of the diodes D611, D612, D613, D614, D615 and D616 and reaching the corresponding wire in the color bus of R, G and B, then to the color signal to the light switching/driving circuit, so as to produce the relevant color light on the stage in accord with the performance.

Figure 11:
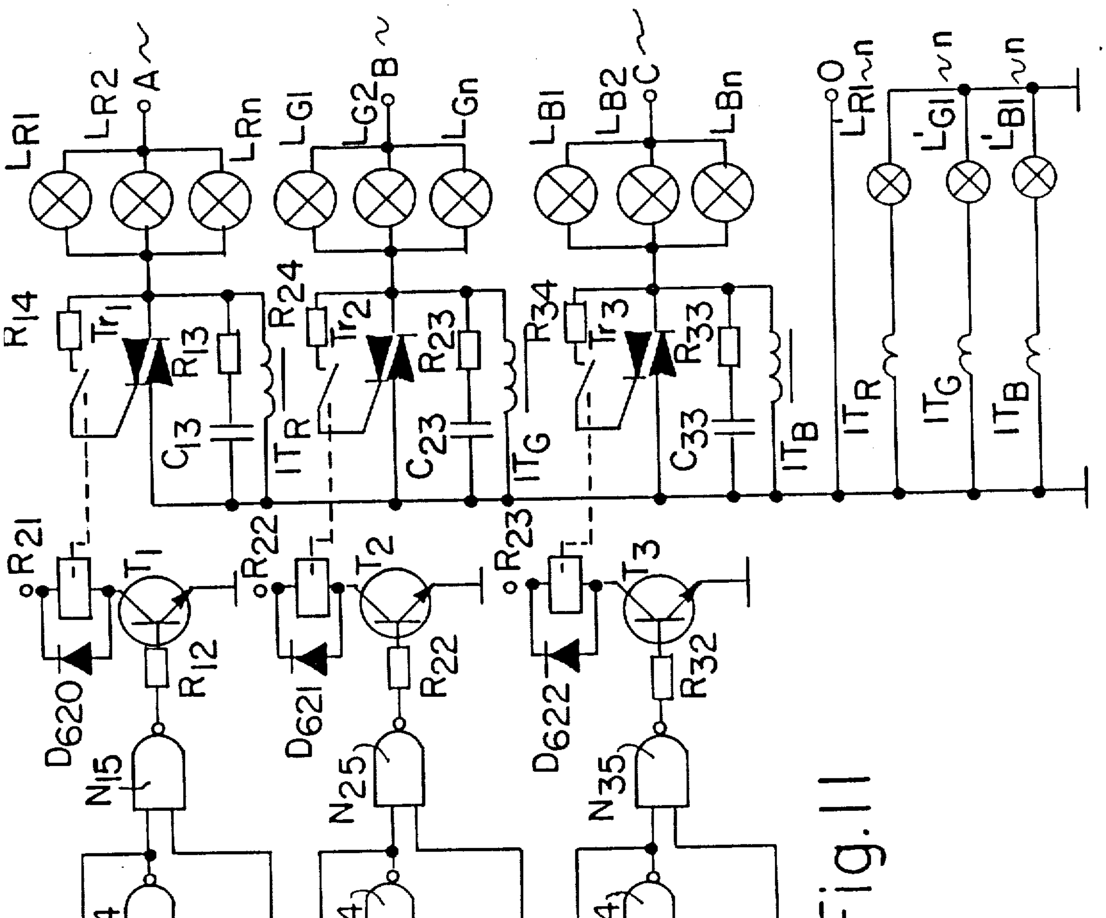
FIG. 11. is diagram showing the principle of the light signal processing circuit and light-driven circuit.

FIG. 11 is the color signal processing circuit and the light driving circuit for lights inside and outside the instrument, in which NAND gates $N_{11}$, $N_{12}$ and $C_{11}$ constitute a pulse backedge trigger circuit. NAND gates $N_{13}$, $N_{14}$ $C_{12}$ and $P_1$ constitute a pulse widening and width adjusting circuit, $R_{13}$ and $C_{13}$ constitute a surge absorber circuit to prevent the thyristor $Tr_1$ from overvoltage. $R_{14}$ is a current-limiting resistor which protects the gat electrode of the thyristor. The diode $D_{620}$ is used to absorb the reversed phase votage of the coil of relay $Re_1$, so as to protect the triode $T_1$. $R_{12}$ is the coupling resistor, and the function of the relay $Re_1$ is electrical isolation. The color pulses from wire R of the bus pass through $N_{11}$ to be reshaped and have their phase inversed, and then, in one branch of the circuit, have their back edge triggered and widened, and sent to NAND $N_{15}$. In another branch the color pulses are directly sent to NAND $N_{15}$. The two negative pulses will have their widths added and then the phase inversed and coupled with output transistor $T_1$ through the current-limiting resistor $R_{12}$ to move relay $Re_1$. When the contactor of $Re_1$ closes, $Tr_1$ is triggered and turned on, and phase A voltage of the three-phase power source will be applied to the red lamps $L_{R1}$, $L_{R2}$ . . . $L_{Rn}$, to have red light emitted. The green and blue lights are lit up similarly.

In addition, when a performer steps on the floor keys, there will inevitably be color pulse signals from the floor sent to one or two or all of Red, Green and Blue buses, and strong lights from the powerful color lights outside of the instrument will beam on dancing-musical instrument, while at the same time the lamps inside the instrument will be off since the thyristor has been turned on and accordingly no output is induced at the color source isolation transformer 32 of FIG. 1. On the other hand, when the performer is not on the floor keyboard, there will be no color pulse signals in the G. R and B buses and the thyristor will not be turned on. Consequently only a small current will pass through the lights both the inside and outside the instrument, which are connected in series. But since the rated power of the lights of the former are much smaller, lamps outside will be faint, and those inside very bright, illuminating the instrument in technicolor.

Besides, $P_1$, $P_2$ and $P_3$ are synchronous triplex potentiometer, as shown in FIG. 11, used to adjust the time of overlap between the different colors lights during their alternation in response to the alternation of the musical tones. Adjusting $P_1$, $P_2$ and $P_3$, one can get different effects of color alternation and the miraculous artistic effects of a variety of color mixings.

In FIG. 11, A∼, B∼, & C∼, are three-phase AC input terminals, while O is the zero terminal.

Moreover, it is to be noted that on the premise that the essential ideas of this invention being adhered to, one may make various modifications thereby producing alternate embodiments of the invention, e.g., the overall shape of the floor keyboard may be circular, or in the shape of an arc. The wall keyboard may be dispensed with completely when one uses a carpet type keyboard on which to do exercise or conduct other kind of performances.

The floor and wall keyboards of this invention can be made of translucent plastic materials, while the electrodes made of transparent or translucent conductive materials so that colorful lights from inside of the instrument can be seen from behind the keyboard.

Figure 12:
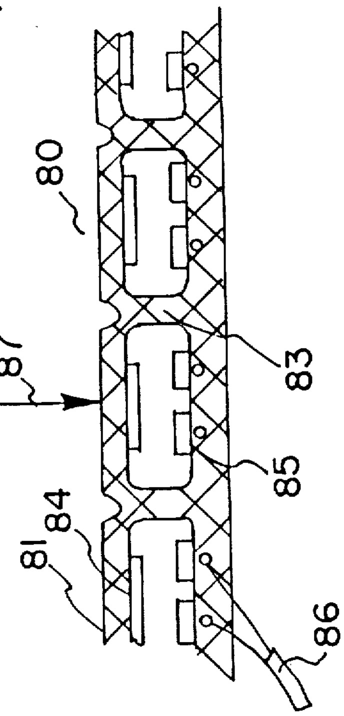
FIG. 12. is another embodiment of the present invention, namely, the flexible keyboard.

Another embodiment of this invention consists in an elastic/soft keyboard 80 made of conductive rubber as shown in FIG. 12. This figure is a sketch of the cross-section of the keyboard, where 81 is a key of soft material such as common insulating rubber. Element 83 is a rubber insulating support between two keys. Element 85 is a pair of conductive rubber electrodes on the lower key-plate and 84 is a conductive rubber electrode on the inner wall of the upper key-plate which connects conductive rubber plates 85. Element 86 is a cable leading out from the pair of conductive rubber electrodes. When the foot or feet of the performer steps on the key, the force applied is in the downward direction as shown by the arrow 87, and the electrode 84 is depressed to touch and connect the pair of electrodes 85, and a 'turn on' signal is sent out through cable 86. On reaching the electronic organ circuit 25, the signal will trigger the sound generator. The exclusive use of soft, flexible structure extends the life of the instrument and enables the keyboard to be wound up into a roll, which is convenient for transportation.

What is claimed is:

1. An instrument for use by a performer in recreational and sports performances comprising:

a floor keyboard having a plurality of flat solid immobile keys arranged thereon, each of said solid immobile keys having at least four fixed electrodes isolated from each other, representing a note and three colors wherein one electrode is common and the second, third and fourth electrodes represent the colors red, blue and green, respectively;

at least one electrically conductive electrode contact means disposed on a part of the performer's shows so that when the performer steps on said floor keyboard, said electrode contact means contacts simultaneously both said common electrode and at least one of said second, third and fourth electrodes on each of said solid immobile keys to generate a key signal;

a sound and light color signal separating circuit for separating said key signal into a sound signal and a light color signal, said separate circuit having a plurality of input terminals as well as a first group of output terminals for delivering said sound signals and a second group of output terminals for delivering said light color signals;

an electronic organ circuit having a key circuit;

a light color signal processing circuit for reshaping said light color signal;

a light driving circuit for generating a light driving signal to activate red, green and blue lamps;

wherein said common electrodes of all of said solid immobile keys are supplied with a specific voltage; said second, third and fourth electrodes on all of said solid immobile keys are connected to the corresponding input terminals of said sound and light color signal separating circuit, respectively; said first group of output terminals are connected to said key circuit of said electronic organ circuit; said second group of output terminals are connected to said light color processing circuit which feeds processed light color signals to said light circuit; said sound signals being used to activate an electronic organ controlled by said electronic organ circuit.

2. An instrument as set forth in claim 1 further comprising:

a wall keyboard having a plurality of flat solid immobile keys arranged thereon, each of said solid immobile keys on said wall keyboard having at least two fixed electrodes isolated from each other, wherein one of said fixed electrodes is a common electrode being connected to said specific voltage, and another is a key signal electrode;

at least one hand hammer with an electrically conductive surface layer for use by said performer;

wherein said key circuit of said electronic organ circuit is connected to said common electrode and said key signal electrode on each of said solid immobile keys on said wall keyboard when said hand hammer contacts simultaneously both said common electrode and said key signal electrode on each of said solid immobile keys on said wall keyboard thereby closing the circuit and generating a key signal for controlling the automatic chord and bass of said electronic organ circuit.

3. An instrument as set forth in claim 1, wherein said sound and light color signal separating circuit comprises red, green and blue signal buses, and a plurality of diode logic circuits with identical structures, each of said diode logic circuits corresponding to one of said solid immobile keys and having a first, second and third group of diodes, said first and second group having three diodes and said third group having four diodes, the positive electrodes of said three diodes of said first group are connected to a first electrode and the negative electrodes of said first group of diodes are connected to said red, green and blue signal buses, respectively; the positive electrodes of three diodes of said second group are connected separately to said second, third and fourth electrodes, and their negative electrodes are connected to said red, green and blue signal buses, respectively; the positive electrodes of said four diodes of said third group are connected with said second, third, fourth and first electrodes, respectively, and their negative electrodes are connected together so as to produce said sound signals; and said red, green and blue signal buses provide said light color signals.

4. An instrument as set forth in claim 2, wherein said sound and light color signal separating circuit comprises red, green and blue signal buses, and a plurality of diode logic circuits with identical structures, each of said diode logic circuits corresponding to one of said solid immobile keys and having a first, second and third group of diodes, said first and second group having three diodes and said third group having four diodes, the positive electrodes of said three diodes of said first group are connected to a first electrode and the negative electrodes of said first group of diodes are connected to said red, green and blue signal buses, respectively; the positive electrodes of three diodes of said second group are connected separately to said second, third and fourth electrodes, and their negative electrodes are connected to said red, green and blue signal buses, respectively; the positive electrodes of said four diodes of said third group are connected with said second, third, fourth and first electrodes, respectively, and their negative electrodes are connected together so as to produce said sound signals; and said red, green and blue signal buses provide said light color signals.

5. An instrument as set forth in claim 1, wherein said light driving circuit comprises three branches for generating red, green and blue light signals, respectively; each of said red, green or blue light signal branches includes an isolation transformer, one terminal of the primary of said isolation transformer being connected to one input terminal of a three-phase AC source via at least one lamp; the two terminals of said primary are connected to two main electrodes of a bilateral thyristor, while one terminal of the secondary of said isolation transformer is connected to the other terminal of the said secondary via at least one lamp of less power than said at least one lamp; by means of said isolation transformer, an equivalent circuit is formed in which said at least one lamp, said at least one less powerful lamp and said power source terminal are connected in series.

6. An instrument as set forth in claim 2, wherein said light driving circuit comprises three branches for generating red, green and blue light signals, respectively; each of said red, green or blue light signal branches includes an isolation transformer, one terminal of the primary of said isolation transformer being connected to one input terminal of a three-phase AC source via at least one lamp; the two terminals of said primary are connected to two main electrodes of a bilateral thyristor, while one terminal of said secondary of said isolation transformer is connected to the other terminal of said secondary via at least one lamp of less power than said at least one lamp; by means of said isolation transformer, an equivalent circuit is formed in which said at least one lamp, said at least one less powerful lamp and said power source terminal are connected in series.

7. An instrument as set forth in claim 1, wherein said light signal processing circuit comprises three branches for processing red, green and blue light signals, respectively;

each light signal branch inclues a first NAND gate; a differential circuit having a capacitor, a resistor and second NAND gate; a pulse-widening and width-adjusting circuit having two NAND gates, a capacitor and an adjustable potentiometer; and a NAND gate which adds up the widths of two negative pulses, respectively, one negative pulse from said circuit having two NAND gates and the other directly from said first NAND gate, and inverses the phases of said summed signal, said NAND gate which adds up the widths of the two negative pulses in turn being coupled to a transistor via a resistor.

8. An instrument as set forth in claim 2, wherein said light signal processing circuit comprises three branches for processing red, green and blue light signals, respectively;

each light signal branch includes a first NAND gate; a differential circuit having a capacitor, a resistor and a second NAND gate; a pulse-widening and width-adjusting circuit having two NAND gates, a capacitor and an adjustable potentiometer; and a NAND gate which adds up the widths of two negative pulses, respectively, one negative pulse from said circuit having two NAND gates and the other directly from said first NAND gate, and inverses the phase of said summed signal, said NAND gate which adds up the width of the two negative pulses in turn being coupled to a transistor via a resistor.

9. An instrument as set forth in claim 2, further comprising:

a plurality of long control rods capable of turning or sliding, said rods are connected to a waver and potentiometer so that the performer can conveniently control timbre, volume and rhythm for music.

10. An instrument as set forth in claim 2, further comprising:

a means for producing an effect of a decaying oscillating vibrato of a smooth glissando, said means including a slender elastic body with both ends fixed, and a potentiometer, wherein an adjustable bar of said potentiometer is mechanically attached to said elastic body, and the first, second and third terminals of said main oscillator's frequency micro-adjustment terminals of said electronic organ circuit to influence the output signal frequency of the main oscillator and produce special sound effects when said elastic body is struck, plucked, pulled or pushed.

11. An instrument as set forth in claim 1, wherein said electrode contact means is made with a layer of conductive rubber attached on the performer's shoes.

12. An instrument as set forth in claim 2, wherein said hand hammer comprises a hammer head made of a translucent material with a bulb inside and with a covering of conductive material; a shank attached to said head, said shank having wires inside; and a handle with a compartment therein for holding a battery and a switch thereon to turn said bulb on or off.

13. An instrument as set forth in claim 1, wherein said electrically isolated electrodes are exposed on the surface of each of said keys.

* * * * *

UNITED STATES PATENT AND TRADEMARK OFFICE
CERTIFICATE OF CORRECTION

PATENT NO. : 4,777,856 Page 1 of 8

DATED : Oct. 18, 1988

INVENTOR(S) : Zhongdu Liu, et al.

It is certified that error appears in the above-identified patent and that said Letters Patent is hereby corrected as shown below:

The Title Page should be deleted to appear as per attached Title Page.

The sheets of drawings consisting of Figures 1-8 should be deleted to appear as per attached sheets.

Signed and Sealed this

Second Day of May, 1989

*Attest:*

DONALD J. QUIGG

*Attesting Officer* *Commissioner of Patents and Trademarks*

United States Patent [19]
Liu et al.

[11] Patent Number: 4,777,856
[45] Date of Patent: Oct. 18, 1988

[54] DANCING-MUSICAL INSTRUMENT

[76] Inventors: Zhongdu Liu; Zhongxian Liu, both of Room 110, No. 5, XinJieKouWai-DaJie Beijing, China

[21] Appl. No.: 895,350

[22] Filed: Aug. 11, 1986

[30] Foreign Application Priority Data

Aug. 14, 1985 [CN] China ........ 85106070
Jul. 26, 1986 [CN] China ........ 86105546

[51] Int. Cl.⁴ ........ A63J 17/00; G09B 15/04; G10H 1/00; G10H 5/00

[52] U.S. Cl. ........ 84/1.01; 84/464 A; 84/478; 84/423 R; 84/DIG. 7; 84/DIG. 25

[58] Field of Search ........ 200/86 R, 86 S, 86 A; 84/1.01, 1464 R, 464 A, 477 R, 478, 423 R, 433, DIG. 7, DIG. 8, DIG. 25

[56] References Cited

U.S. PATENT DOCUMENTS 3,704,399 11/1972 Niinomi ........ 84/1.24
3,754,495 8/1973 Honegger ........ 84/1.01 X
3,956,958 5/1976 Nash et al. ........ 84/DIG. 7
3,997,863 12/1976 Luce ........ 84/DIG. 7
4,121,488 10/1978 Akiyama ........ 84/DIG. 7

FOREIGN PATENT DOCUMENTS 2526624 1/1976 Fed. Rep. of Germany .
57-8595 1/1982 Japan .
60-98492 6/1985 Japan .

*Primary Examiner*—Stanley J. Witkowski
*Attorney, Agent, or Firm*—Collard, Roe & Galgano

[57] ABSTRACT

A new type of musical instrument and performance apparatus is disclosed and is used with the special performing art called "Instrument dance", "instrument exercise" or "instrument boxing" etc. The instrument comprises a floor keyboard, on which the performer can either dance and produce switching signals with his or her feet, hand or hand hammer in accordance with the intention of the performer. In addition, a similar wall keyboard is provided along with a multi-color system and an electronic organ circuit. The performer can play on the floor keyboard while at the same time adjusting with ease the tone, timbre, volume and color, to thereby achieve the multiple artistic effect of a single performer producing the shape, sound, light and color of the performance.

13 Claims, 6 Drawing Sheets

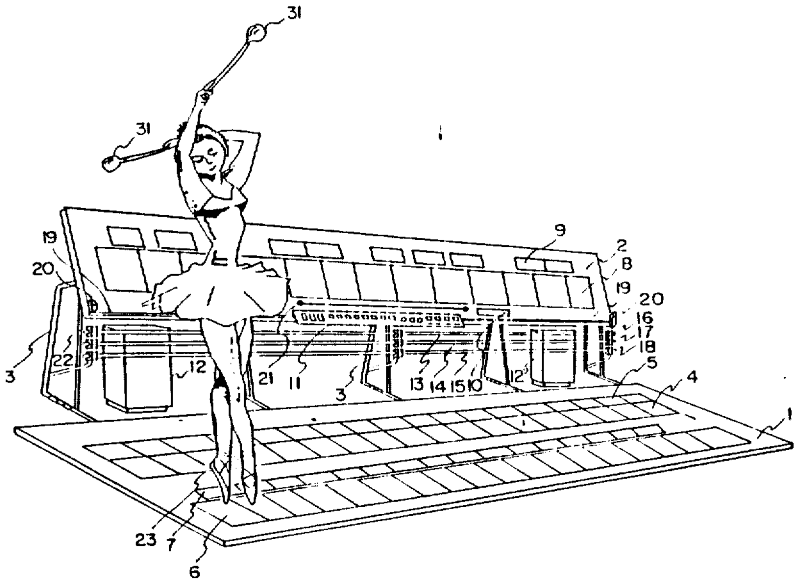

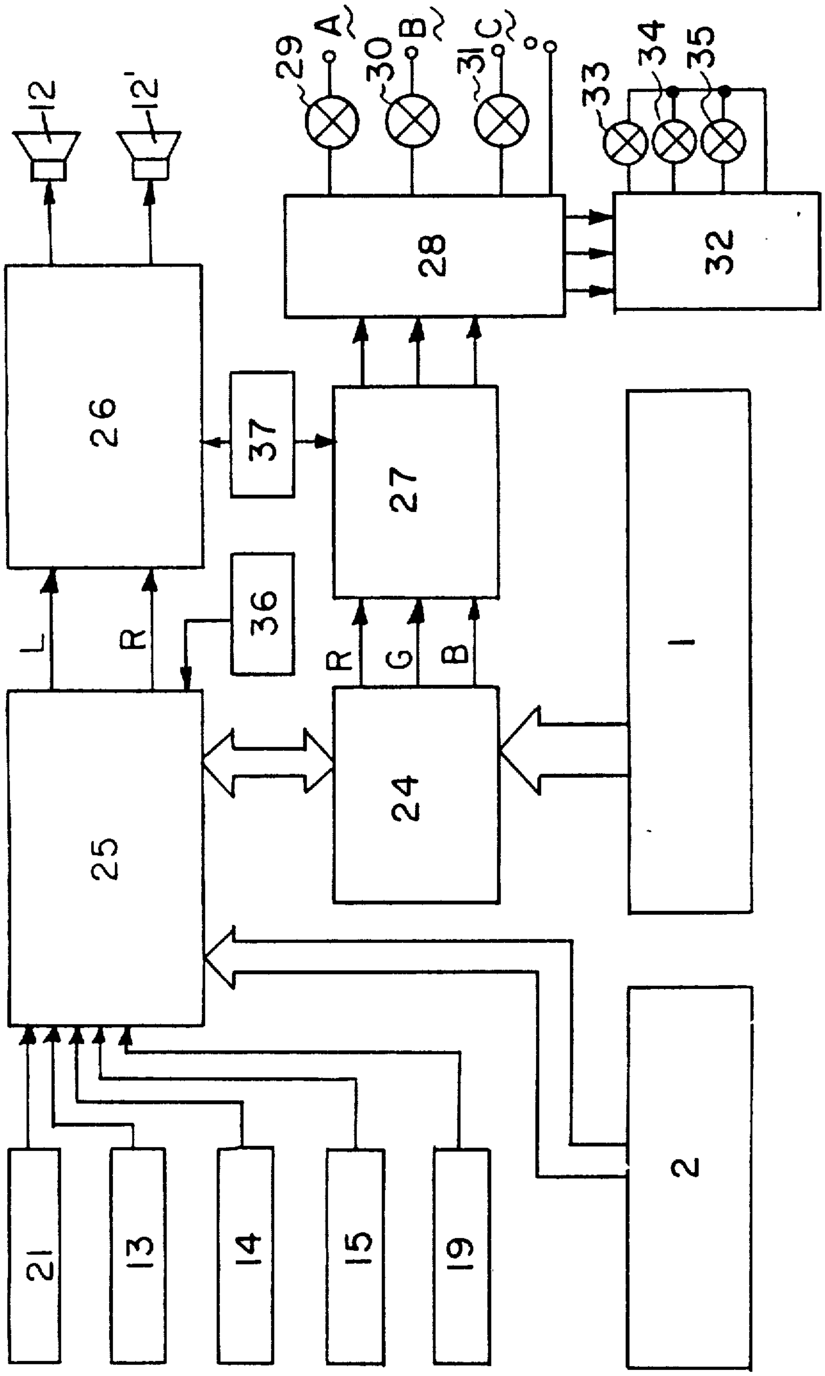
Fig. I